(12) United States Patent
Misaki

(10) Patent No.: US 9,118,406 B2
(45) Date of Patent: Aug. 25, 2015

(54) MEASUREMENT APPARATUS AND MEASUREMENT METHOD

(71) Applicant: ANRITSU CORPORATION, Kanagawa (JP)

(72) Inventor: Yuji Misaki, Kanagawa (JP)

(73) Assignee: ANRITSU CORPORATION, Kanagawa (JP)

(*) Notice: Subject to any disclaimer, the term of this patent is extended or adjusted under 35 U.S.C. 154(b) by 319 days.

(21) Appl. No.: 13/763,857

(22) Filed: Feb. 11, 2013

(65) Prior Publication Data

US 2013/0210370 A1 Aug. 15, 2013

(30) Foreign Application Priority Data

Feb. 13, 2012 (JP) ................................. 2012-028491
Jan. 17, 2013 (JP) ................................. 2013-006174

(51) Int. Cl.
*H04W 24/00* (2009.01)
*H04B 17/00* (2015.01)
*H04B 17/309* (2015.01)

(52) U.S. Cl.
CPC ............ *H04B 17/00* (2013.01); *H04B 17/0085* (2013.01); *H04B 17/309* (2015.01)

(58) Field of Classification Search
CPC .................................................. H04W 24/06
USPC ............. 455/425, 37.11, 37.14, 115.1, 115.2, 455/226.1
See application file for complete search history.

(56) References Cited

U.S. PATENT DOCUMENTS

| | | | |
|---|---|---|---|
| 2006/0094416 A1* | 5/2006 | Endo et al. ...................... 455/423 |
| 2009/0131039 A1* | 5/2009 | Lorenzen ....................... 455/423 |
| 2011/0124295 A1* | 5/2011 | Mahjoubi Amine et al. ........................... 455/67.14 |
| 2012/0207030 A1* | 8/2012 | Luong ............................ 370/245 |
| 2013/0049786 A1* | 2/2013 | El-Hassan et al. ........ 324/756.01 |
| 2013/0178203 A1* | 7/2013 | Venkataraman .............. 455/423 |
| 2013/0197850 A1* | 8/2013 | Yu et al. ......................... 702/117 |

FOREIGN PATENT DOCUMENTS

JP 2003-046431 A 2/2003

* cited by examiner

*Primary Examiner* — Wen Huang
(74) *Attorney, Agent, or Firm* — Pearne & Gordon LLP

(57) ABSTRACT

The measurement apparatus 10 includes a transmission and reception unit 14 that receives a continuous test signal which is output from the mobile terminal 30 and in which test signals based on the plurality of communication methods continue at predetermined time intervals, an acquisition section 21 that sequentially acquires the test signals based on the plurality of communication methods included in the continuous test signal, a measurement section 22 that sequentially measures the test signals acquired by the acquisition section 21, a measurement result storage section 23 that sequentially stores the data of the measurement result of the measurement section 22, and a display unit 15 that displays the data of the measurement result stored in the measurement result storage section 23.

8 Claims, 6 Drawing Sheets

| COMMUNICATION METHOD | SIGNAL LEVEL | MODULATION ACCURACY | OCCUPIED BANDWIDTH | SPURIOUS EMISSION MASK |
|---|---|---|---|---|
| STD1 | ○○○ | ----- | ----- | ----- |
| STD2 | ○○○ | ----- | ○○○ | ----- |
| STD3 | ----- | ○○○ | ----- | ----- |
| STD4 | ○○○ | ----- | ----- | ----- |
| STD5 | ----- | ----- | ----- | ○○○ |

MEASUREMENT APPARATUS AND MEASUREMENT METHOD

TECHNICAL FIELD

The present invention relates to a measurement apparatus and a measurement method for measuring the output signal of a mobile terminal, such as a mobile phone.

BACKGROUND ART

As this kind of apparatus in the related art, a mobile terminal transmission power measurement apparatus disclosed in Patent Document 1 is known.

The mobile terminal transmission power measurement apparatus disclosed in Patent Document 1 includes: setting means for setting the number of changes in transmission power and a transmission power variation of which transmission request is sent to a mobile terminal; request means for sending a request of the number of changes in transmission power and the transmission power variation to the mobile terminal; slot detection means for detecting slots of the mobile terminal on the basis of transmission power that is transmitted from the mobile terminal; and slot power detection means for detecting the power of each slot or the power variation between slots.

Through this configuration, the mobile terminal transmission power measurement apparatus disclosed in Patent Document 1 checks the operation of the mobile terminal by comparing the detection result of the slot power detection means with the setting information of the setting means.

RELATED ART DOCUMENT

Patent Document

[Patent Document 1] JP-A-2003-046431

DISCLOSURE OF THE INVENTION

Problem that the Invention is to Solve

Meanwhile, with the rapid spread of mobile terminals represented by mobile phones in recent years, a technique allowing one mobile terminal to use a plurality of communication methods has been developed. For this reason, in the production line of this kind of mobile terminal, there is a demand for measurement apparatuses capable of performing measurement at higher speed for measurement items according to each of a plurality of communication methods.

However, when measuring a mobile terminal conforming to a plurality of communication methods using the mobile terminal transmission power measurement apparatus disclosed in Patent Document 1, there has been a problem in that the speed cannot be increased.

Specifically, when measuring the signal level in, for example, five communication methods using the mobile terminal transmission power measurement apparatus disclosed in Patent Document 1, a step of measuring the signal level after performing a call connection process according to the communication methods is repeated by the number of communication methods, that is, 5 times. As a result, since a measurement time becomes long, it is necessary to shorten the measurement time.

The present invention has been made in view of the above situation, and it is an object of the present invention to provide a measurement apparatus and a measurement method capable of shortening the time required for the measurement of a mobile terminal conforming to a plurality of communication methods.

Means for Solving the Problem

A measurement apparatus according to claim 1 of the present invention is a measurement apparatus (10) that measures an output signal in a test mode of a terminal to be tested (30) capable of switching between a communication mode in which communication is performed according to a plurality of different communication methods and the test mode for testing communication characteristics in the communication mode. The measurement apparatus has a configuration including measurement item setting means (13) for setting measurement items for each of the plurality of communication methods; measurement item information transmission means (14) for transmitting information of set measurement items, which are set by the measurement item setting means, to the terminal to be tested so as to output continuous test signals (50), each of which is a signal that the terminal to be tested outputs on the basis of the information of the set measurement items in the test mode based on each of the communication methods, and in which a predetermined time gap is set between each of the test signals (51 to 54); continuous test signal receiving means (14) for receiving the continuous test signal from the terminal to be tested; and measurement means (20) for measuring characteristics of each of the test signals, which are included in the received continuous test signal, for the set measurement items.

Through this configuration, since the measurement apparatus according to claim 1 of the present invention receives a continuous test signal, in which test signals based on the plurality of communication methods continue at predetermined time intervals, and measures the characteristics of each of the test signals included in the received continuous test signal for the set measurement items, it is possible to measure the test signals based on the plurality of communication methods without performing call connection and the like. Therefore, the measurement apparatus according to claim 1 of the present invention can shorten the time required for the measurement of a mobile terminal conforming to the plurality of communication methods.

A measurement method according to claim 1 of the present invention further has a configuration in which, in the measurement step, each characteristic of one test signal is measured in parallel with acquisition of a test signal subsequent to the one test signal after the one test signal is acquired by an acquisition section.

Through this configuration, since the measurement method according to claim 1 of the present invention can perform the acquisition and measurement of test signals in parallel, it is possible to significantly shorten the time required for the measurement of the terminal to be tested which conforms to the plurality of communication methods.

A measurement apparatus according to claim 2 of the present invention has a configuration in which the continuous test signal receiving means receives a continuous test signal (60) including at least two test signals that are based on the same communication method and have different signal levels.

Through this configuration, the measurement apparatus according to claim 2 of the present invention can obtain a measurement result when changing the signal level in the same communication method.

A measurement apparatus according to claim 3 or 4 of the present invention has a configuration in which each of the measurement sections starts measurement of each characteristic of the one test signal from a point in time after a predetermined time has passed from acquisition start time at which the acquisition section starts the acquisition of a test signal subsequent to the one test signal.

Through this configuration, since the measurement apparatus according to claim 3 or 4 of the present invention can perform the acquisition and measurement of test signals in parallel, it is possible to significantly shorten the time required for the measurement of the terminal to be tested which conforms to the plurality of communication methods.

A measurement method according to claim 5 of the present invention is a measurement method using the measurement apparatus (10) according to claim 1. The measurement method includes: a measurement item setting step (S12) of setting measurement items for each of the plurality of communication methods; a measurement item information transmission step (S13) of transmitting information of set measurement items, which are set in the measurement item setting step, to the terminal to be tested so as to output continuous test signals (50), each of which is a signal that the terminal to be tested outputs on the basis of the information of the set measurement items in the test mode based on each of the communication methods, and in which a predetermined time gap is set between each of the test signals (51 to 54); a continuous test signal receiving step (S17) of receiving the continuous test signal from the terminal to be tested; and a measurement step (19) of measuring characteristics of each of the test signals, which are included in the received continuous test signal, for the set measurement items.

Through this configuration, since the measurement method according to claim 5 of the present invention receives a continuous test signal, in which test signals based on the plurality of communication methods continue at predetermined time intervals, and measures the characteristics of each of the test signals included in the received continuous test signal for the set measurement items, it is possible to measure the test signals based on the plurality of communication methods without performing call connection and the like. Therefore, the measurement method according to claim 6 of the present invention can shorten the time required for the measurement of a mobile terminal conforming to the plurality of communication methods.

A measurement method according to claim 6 of the present invention has a configuration in which, in the measurement step, measurement of each characteristic of the one test signal is started from a point in time after a predetermined time has passed from acquisition start time at which the acquisition section starts the acquisition of a test signal subsequent to the one test signal.

Through this configuration, since the measurement method according to claim 6 of the present invention can perform the acquisition and measurement of test signals in parallel, it is possible to significantly shorten the time required for the measurement of the terminal to be tested which conforms to the plurality of communication methods.

Advantage of the Invention

According to the present invention, it is possible to provide a measurement apparatus and measurement method advantageous in that time required for the measurement of a mobile terminal conforming to a plurality of communication methods can be shortened.

BRIEF DESCRIPTION OF THE DRAWINGS

FIG. 6 is a diagram showing a display example of a measurement result displayed on a display unit in the measurement apparatus according to the embodiment of the present invention.

BEST MODE FOR CARRYING OUT THE INVENTION

Hereinafter, embodiments of the present invention will be described with reference to the accompanying drawings.

Figure 1:
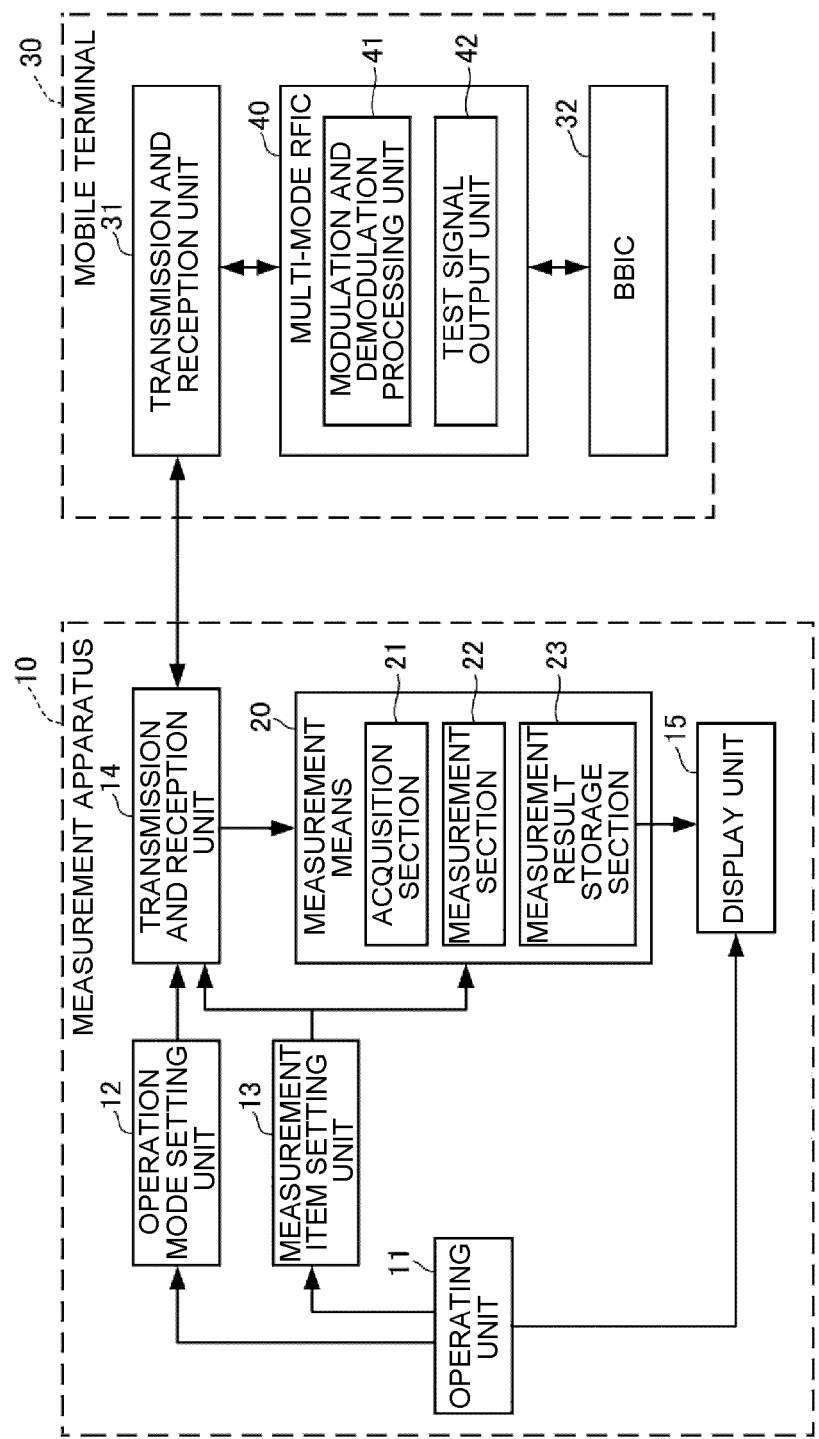
FIG. 1 is a block diagram showing the configuration of a measurement apparatus according to an embodiment of the present invention.

As shown in FIG. 1, a measurement apparatus 10 according to the present embodiment measures an output signal of a mobile terminal 30 as a terminal to be tested. The mobile terminal 30 conforms to a plurality of communication methods, and can switch between a communication mode, in which the mobile terminal 30 communicates with a base station according to each communication method, and a test mode for testing the communication characteristics in the communication mode.

The measurement apparatus 10 includes an operating unit 11, an operation mode setting unit 12, a measurement item setting unit 13, a transmission and reception unit 14, measurement means 20, and a display unit 15.

A tester operates the operating unit 11 in order to input the measurement conditions in the measurement of the mobile terminal 30 or set the display content of the display unit 15. For example, the operating unit 11 is configured to include an input device such as a keyboard, a dial, or a mouse, a display that displays the measurement conditions and the like, and a control circuit or software that controls these.

The operation mode setting unit 12 sets the operation mode of the mobile terminal 30 on the basis of the signal from the operating unit 11. That is, the operation mode setting unit 12 designates either an communication mode or a test mode for the mobile terminal 30.

The measurement item setting unit 13 sets measurement items in the test mode on the basis of the signal from the operating unit 11. The measurement item setting unit 13 forms measurement item setting means according to the present invention.

The transmission and reception unit 14 is connected to a transmission and reception unit 31 of the mobile terminal 30, for example, through a coaxial cable so as to communicate with the transmission and reception unit 31. The transmission and reception unit 14 forms measurement item information transmission means and continuous test signal receiving means according to the present invention.

Specifically, the transmission and reception unit 14 includes a transmission system circuit and a reception system circuit. The transmission system circuit includes a DA (Digital to Analog) converter, an amplifier, a filter, a frequency-variable local oscillator, an up-converter, a transmission antenna, and the like. The reception system circuit includes an AD (Analog to Digital) converter, a filter, an amplifier, a down-converter, a frequency-variable local oscillator, a receiving antenna, and the like.

Through this configuration, the transmission and reception unit 14 can convert a digital signal, which is input from the operation mode setting unit 12 and the measurement item setting unit 13, into an RF (radio frequency) signal of a predetermined frequency band and transmit the RF signal to the transmission and reception unit 31. In addition, the transmission and reception unit 14 can receive an RF signal of a predetermined frequency band from the transmission and reception unit 31, convert the RF signal into a digital signal, and output the digital signal to the measurement means 20.

The measurement means 20 includes an acquisition section 21 that acquires an output signal of the transmission and reception unit 14, a measurement section that measures a signal acquired by the acquisition section 21, and a measurement result storage section 23 that stores data of the measurement result of the measurement section 22.

The display unit 15 reads and displays the data of the measurement result stored in the measurement result storage section 23.

The mobile terminal 30 includes the transmission and reception unit 31, a BBIC (baseband integrated circuit) 32, and a multi-mode RFIC (high-frequency integrated circuit) 40, and operates in either the communication mode or the test mode. In addition, although not shown in the drawing, the mobile terminal 30 includes a CPU, a ROM, a RAM, and the like, and operates according to a program stored in the ROM in advance.

In the communication mode, the transmission and reception unit 31 communicates with a base station (not shown) according to a predetermined communication method. In addition, in the test mode, the transmission and reception unit 31 receives the information of the measurement item set by the measurement item setting unit 13 of the measurement apparatus 10 and transmits a test signal set in advance to measure the measurement item.

The BBIC 32 has a function of transmitting data to be transmitted, as a baseband signal, to the multi-mode RFIC 40 at the time of transmission in the communication mode and a function of processing the baseband signal received from the multi-mode RFIC 40 as received data at the time of reception in the communication mode. For the communication between the BBIC 32 and the multi-mode RFIC 40, a baseband signal or a control signal, which is a digital signal, is transmitted or received through a predetermined interface.

The multi-mode RFIC 40 is a high-frequency integrated circuit conforming to a plurality of communication methods, and includes a modulation and demodulation processing unit 41 and a test signal output unit 42.

The multi-mode RFIC 40 has a function of receiving a baseband signal received from the BBIC 32, modulating a carrier with the baseband signal, and transmitting the modulated signal as an RF signal for communicating with a base station at the time of transmission in the communication mode and a function of receiving the RF signal from the base station, demodulating the baseband signal, and transmitting the demodulated signal to the BBIC 32 at the time of reception in the communication mode.

On the other hand, the multi-mode RFIC 40 outputs the test signal, which is output from the test signal output unit 42 and is generated according to a plurality of communication methods, to the transmission and reception unit 31 in the test mode.

Figure 2:
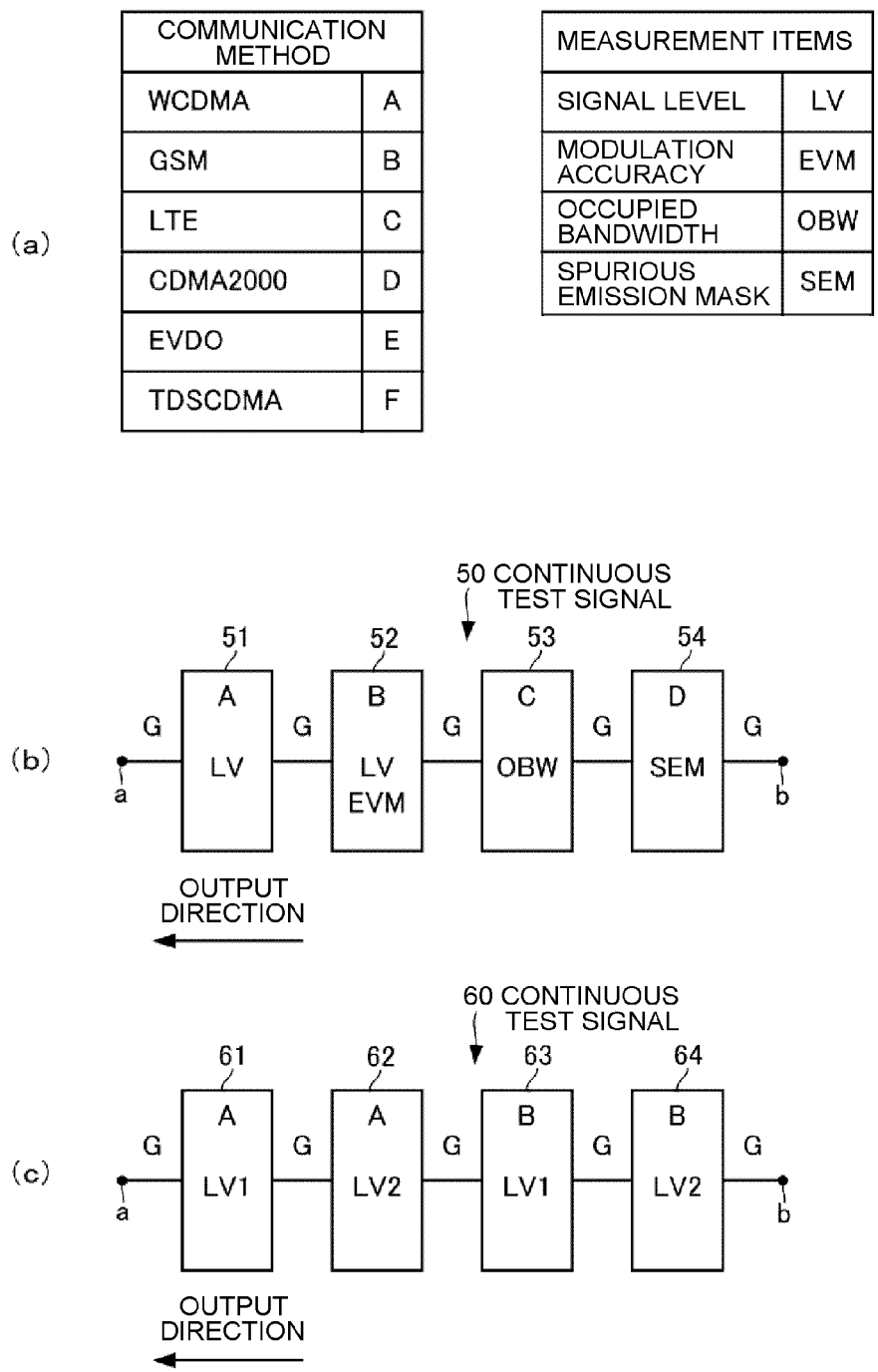
FIG. 2 is an explanatory diagram of a continuous test signal output from a mobile terminal that is an object to be measured by the measurement apparatus according to the embodiment of the present invention.

Here, examples of the communication method, which can be used by the mobile terminal 30, and the continuous test signal output from the mobile terminal 30 will be described with reference to FIG. 2.

As shown in a table on the left side of FIG. 2(a), the mobile terminal 30 has a configuration conforming to six kinds of communication methods. That is, the mobile terminal 30 can perform communication according to various communication methods of WCDMA (Wideband Code Division Multiple Access), GSM (Global System for Mobile Communications), LTE (Long Term Evolution), CDMA2000 (Code Division Multiple Access 2000), EVDO (Evolution Data Only), and TDSCDMA (Time Division Synchronous Code Division Multiple Access).

In addition, a mobile terminal which is an object to be measured by the measurement apparatus 10 is not limited to performing communication according to each of the six kinds of communication methods described above. For example, the measurement apparatus 10 can set a mobile terminal conforming to a plurality of communication methods, which include a communication method of a wireless LAN (Local Area Network) based on Wi-Fi (registered trademark) standards, as an object to be measured.

The modulation and demodulation processing unit 41 modulates a carrier with a baseband signal from the BBIC 32 according to any one of the six kinds of communication methods described above at the time of transmission in the communication mode, and receives an RF signal from the base station and demodulates the baseband signal at the time of reception in the communication mode.

The test signal output unit 42 outputs a test signal, which is set in advance, according to at least two of the six kinds of communication methods described above, in the test mode. This test signal is related to standards, which allow measurement without making call connection, among the standards defined in the respective communication methods. As examples of the measurement item of the test signal, measurement items in a table on the right side of FIG. 2(a) may be mentioned. That is, there are measurement items of a signal level (LV), modulation accuracy (EVM), an occupied bandwidth (OBW), and a spurious emission mask (SEM). The test signal output unit 42 receives the information of these measurement items from the measurement item setting unit of the measurement apparatus 10 and outputs a test signal for performing measurement related to the received measurement items.

In addition, the test signal output unit 42 outputs a continuous test signal in which test signals according to the respective communication methods continue at predetermined time intervals. Specifically, the test signal output unit 42 outputs a continuous test signal 50 shown in FIG. 2(b) or a continuous test signal 60 shown in FIG. 2(c).

As shown in FIG. 2(b), the continuous test signal 50 includes test signals based on four communication methods. That is, the continuous test signal 50 includes a WCDMA test signal 51 (symbol A), a GSM test signal 52 (symbol B), an LTE test signal 53 (symbol C), a CDMA2000 test signal 54 (symbol D), and a predetermined time gap G set between the respective test signals, from the front end a to the rear end b. Here, the time length of each of the test signals (A to D) and each time gap G change according to the communication method or the measurement item, processing power of the multi-mode RFIC 40, and the like. For example, the time length of each test signal is about 1 second to several seconds, and the time gap G is about 1 second.

In FIG. 2(b), the WCDMA test signal 51, the GSM test signal 52, the LTE test signal 53, and the CDMA2000 test signal 54 are signals for measuring the signal level, signal level and modulation accuracy, occupied bandwidth, and spurious emission mask, respectively.

In addition, as shown in FIG. 2(c), the continuous test signal 60 includes two test signals that are based on the same communication method and have different signal levels. That is, the continuous test signal 60 includes two WCDMA test signals 61 and 62 (symbol A) having different signal levels, two GSM test signals 63 and 64 (symbol B) having different signal levels, and a predetermined time gap G set between the respective test signals, from the front end a to the rear end b.

In FIG. 2(c), both the WCDMA test signals 61 and 62 are signals for measuring the signal level, but their signal levels are different. Similarly, the GSM test signals 63 and 64 are signals for measuring the signal level, but their signal levels are different.

In addition, in FIG. 2(c), the signal level of the continuous test signal 60 may decrease gradually in the WCDMA test signal 61 and increase gradually in the WCDMA test signal 62, for example. In addition, the continuous test signal 60 may include three or more test signals that are based on the same communication method and have different signal levels. For example, the continuous test signal 60 may include three WCDMA test signals having different signal levels and five GSM test signals having different signal levels.

In addition, the test signal output unit 42 may store a test signal in advance for each measurement item in each communication method and output a continuous test signal, in which respective test signals continue, to the measurement apparatus 10 in response to the instruction from the measurement apparatus 10. In addition, the test signal output unit 42 may output a baseband signal prepared in advance to the modulation and demodulation processing unit 41, and the modulation and demodulation processing unit 41 may generate a continuous test signal by performing modulation according to each communication method and output the continuous test signal to the measurement apparatus 10.

As shown in FIGS. 2(b) and 2(c), in the test mode, the mobile terminal 30 can output a test signal based on each communication method without performing procedures, such as call connection set according to the communication method.

Next, the detailed configuration of the measurement means 20 will be described with reference to FIG. 3.

Figure 3:
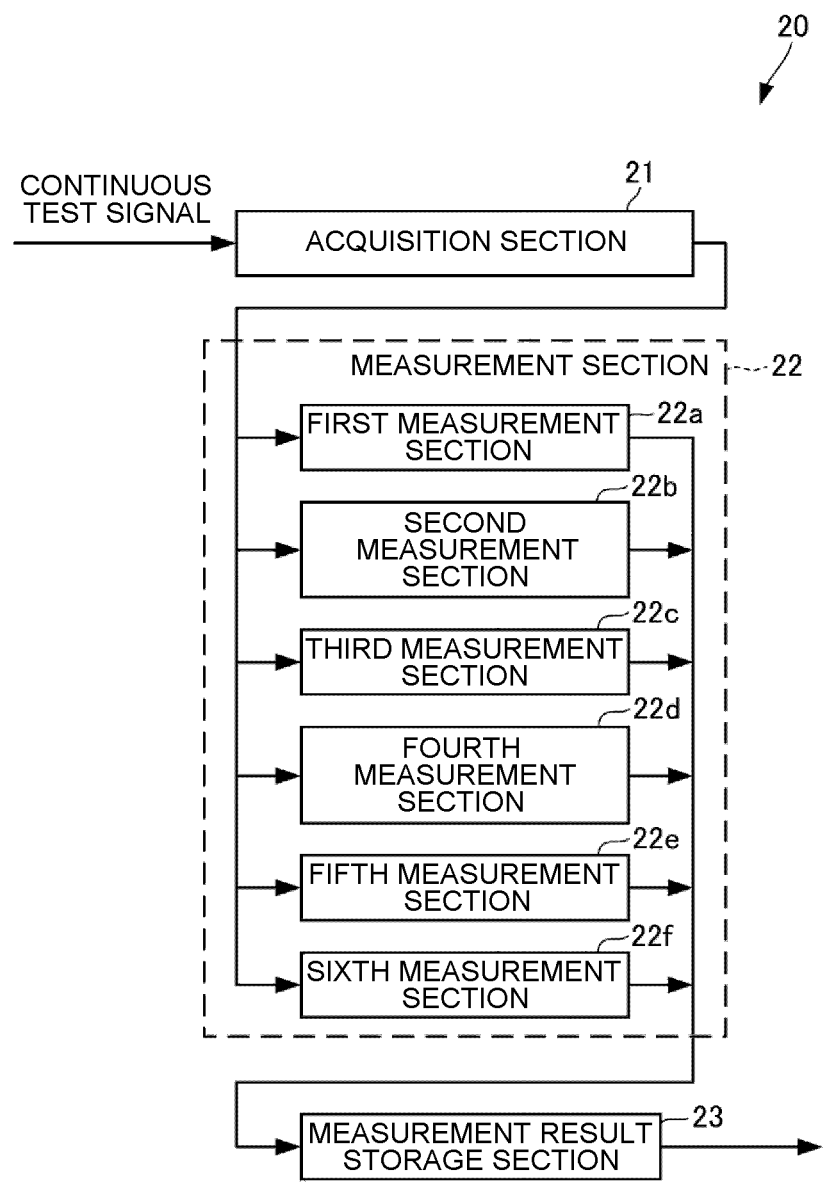
FIG. 3 is a block diagram showing the configuration of measurement means in the measurement apparatus according to the embodiment of the present invention.

As shown in FIG. 3, the measurement means 20 includes the acquisition section 21, the measurement section 22, and the measurement result storage section 23. For example, the measurement means 20 is configured to include a control unit, which includes a CPU, a ROM, a RAM, and the like, and a program stored in the ROM in advance. The measurement means 20 acquires the measurement item information from the measurement item setting unit 13 and measures a predetermined test signal.

The acquisition section 21 receives the continuous test signal that the transmission and reception unit 14 has received from the mobile terminal 30, acquires sequentially test signals according to the respective communication methods included in the continuous test signal, and stores the test signals.

The measurement section 22 includes a plurality of test sections so that test signals according to a plurality of communication methods can be measured. In the present embodiment, the measurement section 22 includes six measurement sections of a first measurement section 22a, a second measurement section 22b, a third measurement section 22c, a fourth measurement section 22d, a fifth measurement section 22e, and a sixth measurement section 22f so as to conform to six kinds of communication methods that the mobile terminal 30 can use. For example, the first measurement section 22a measures a test signal based on the WCDMA method, the second measurement section 22b measures a test signal based on the GSM method, and the third measurement section 22c measures a test signal based on the LTE method.

The measurement result storage section 23 is configured to include a RAM, for example, and stores the data of measurement results of the first to sixth measurement sections 22a to 22f.

Next, the operation of the measurement means 20 will be specifically described with reference to FIG. 4.

FIG. 4(a) schematically shows the waveform of a continuous test signal 70 input to the measurement means 20. The continuous test signal 70 includes test signals 71 to 75 based on first to fifth different communication methods (STD1 to STD5) and time gaps G1 to G6 from the front end a to the rear end b.

FIG. 4(b) shows a period for which the acquisition section 21 acquires the respective test signals 71 to 75. As shown in the drawing, the acquisition section 21 acquires a signal between the start and end positions of each of the test signals 71 to 75.

FIG. 4(c) shows a timing at which the measurement section 22 measures each of the test signals 71 to 75. As shown in the drawing, the first to fifth measurement sections 22a to 22e start the measurement of the test signals 71 to 75 from the point in time at which the acquisition of the test signals 71 to 75 ends. Alternatively, the first to fifth measurement sections 22a to 22e may be configured to start the measurement of the test signals 71 to 75 from the point in time after a predetermined time has passed from the start of acquisition of the test signals 71 to 75.

FIG. 4(d) shows a timing at which the measurement result storage section 23 acquires the data of measurement results for the test signals 71 to 75. As shown in the drawing, the data of each measurement result is stored in the measurement result storage section 23 in time series.

Figure 4:
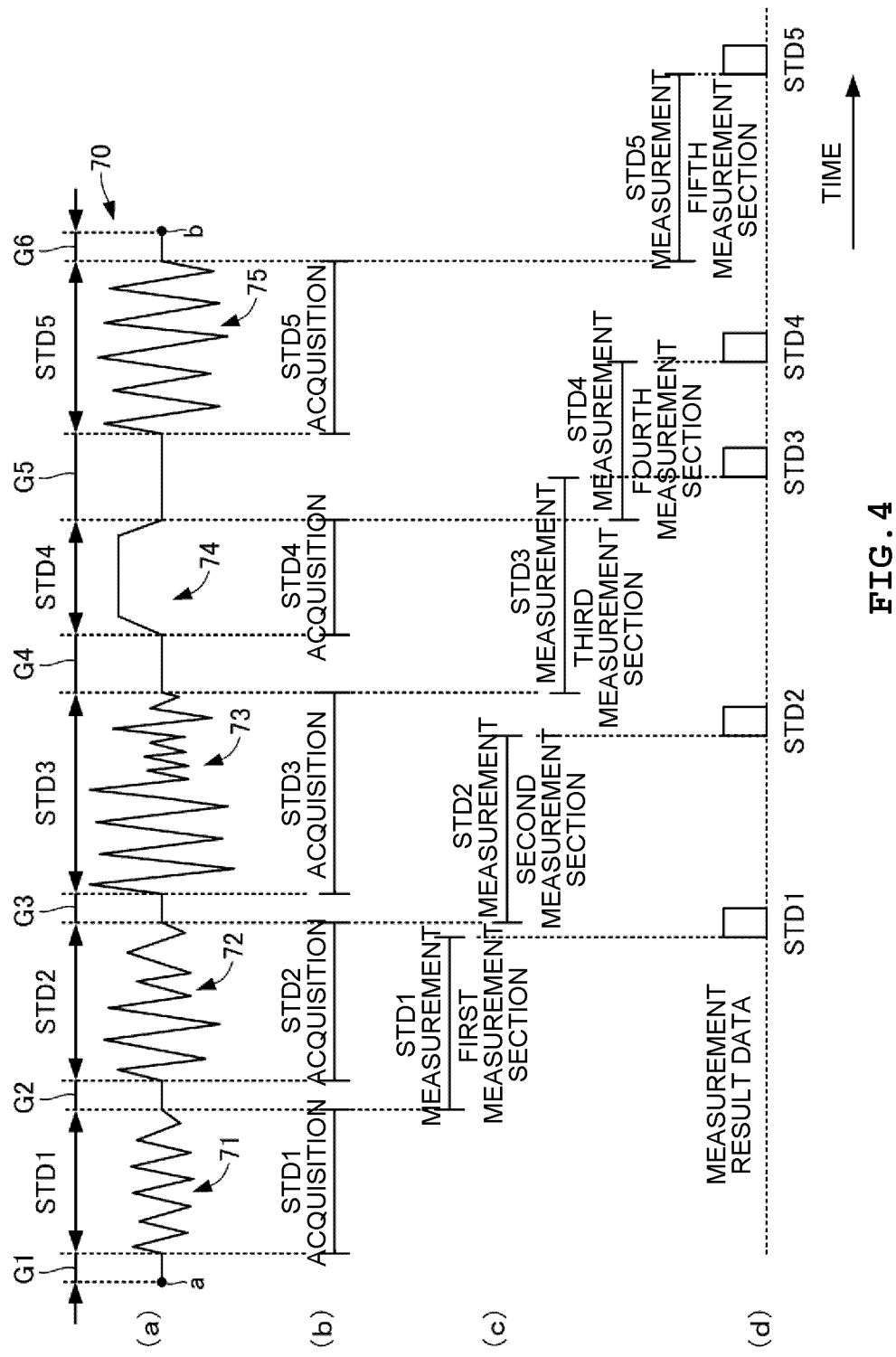
FIG. 4 is an explanatory diagram of the operation of the measurement means in the measurement apparatus according to the embodiment of the present invention.

As shown in FIG. 4, since the measurement means 20 is configured to perform the acquisition and measurement of each of the test signals 71 to 75 in parallel, it is possible to significantly shorten the time required for the measurement of a mobile terminal conforming to a plurality of communication methods.

In addition, the measurement means 20 can perform the acquisition and measurement of each test signal according to the switching of the test signals 71 to 75, that is, according to the output timing of each test signal of the mobile terminal 30. Therefore, since the measurement means 20 can meet a variety of mobile terminals of which specifications are different in terms of the time length of a test signal or the length of a time gap, it is possible to significantly shorten the time required for the measurement of the mobile terminals.

Figure 5:
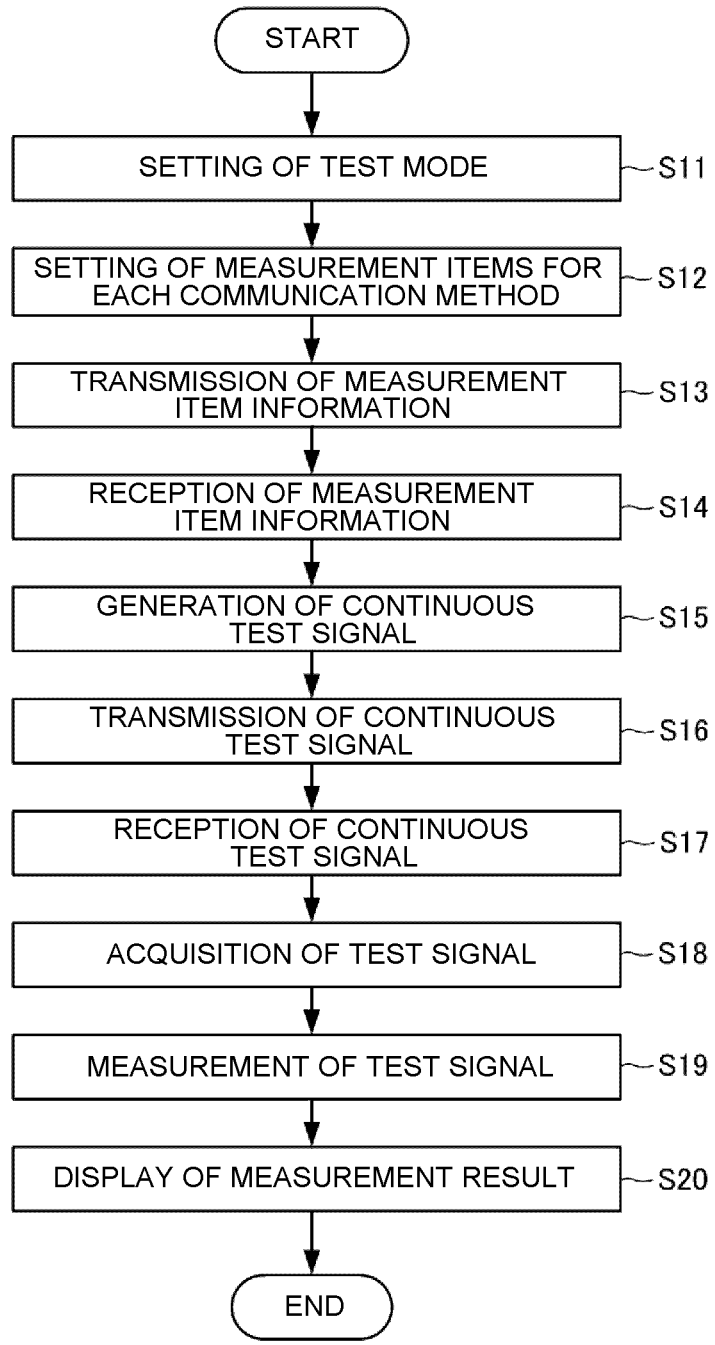
FIG. 5 is a flow chart showing the operation of the measurement apparatus according to the embodiment of the present invention.

Next, the operation of the measurement apparatus 10 according to the present embodiment will be described using the flow chart shown in FIG. 5 while appropriately referring to the block diagram shown in FIG. 1.

When a tester sets a test mode by operating the operating unit 11, the operation mode setting unit 12 outputs a control signal to the transmission and reception unit 14 so that the operation mode of the mobile terminal 30 is changed to the test mode. This control signal is subject to DA conversion by the transmission and reception unit 14 and is then converted into an RF signal having a predetermined frequency by an up-converter. This RF signal is transmitted to the mobile terminal 30. As a result, the operation mode of the mobile terminal 30 is set to the test mode (step S11).

The measurement item setting unit 13 sets the information of measurement items according to each communication method on the basis of the tester's operation of the operating unit 11 (step S12), and outputs the information to the transmission and reception unit 14. This information of measurement items is subjected to DA conversion by the transmission and reception unit 14 and is then converted into an RF signal having a predetermined frequency by the up-converter. This RF signal is transmitted to the mobile terminal 30 (step S13). In addition, the information of measurement items is also output to the measurement means 20.

The transmission and reception unit 31 of the mobile terminal 30 receives the information of measurement items (step S14), and converts it into a predetermined intermediate frequency signal using a down-converter. Then, the intermediate frequency signal is subjected to AD conversion and is output to the multi-mode RFIC 40.

The test signal output unit 42 of the multi-mode RFIC 40 generates a continuous test signal (for example, FIG. 2(b)) on the basis of the received information of measurement items according to each communication method (step S15), and outputs the continuous test signal to the transmission and reception unit 31.

The transmission and reception unit 31 performs DA conversion of the continuous test signal input from the test signal output unit 42 and is then converted into an RF signal having a predetermined frequency by the up-converter, and the RF signal is transmitted to the measurement apparatus 10 (step S16).

When the continuous test signal is received (step S17), the transmission and reception unit 14 of the measurement apparatus 10 converts the continuous test signal into a predetermined intermediate frequency signal using a down-converter, performs AD conversion, and outputs the result to the measurement means 20.

In addition, in transmission and reception of a continuous test signal, it is possible to adopt a configuration in which RF signals of different frequency bands are used as respective test signals included in the continuous test signal (for the respective communication methods). In this case, it is preferable that the transmission and reception unit 14 of the measurement apparatus 10 be configured to change the local oscillation frequency of a frequency-variable local oscillator according to each communication method and perform down-conversion.

The acquisition section 21 of the measurement means acquires sequentially, test signals based on the respective communication methods, which are included in the continuous test signal, as shown in FIG. 4(a) (step S18).

In the measurement section 22, the first measurement section 22a, the second measurement section 22b, and the like measure the test signals based on the respective communication methods that have been acquired by the acquisition section 21, respectively (step S19), and output the data of the measurement results to the measurement result storage section 23. The measurement result storage section 23 stores the data of the measurement results sequentially.

The display unit 15 reads the data of the measurement results from the measurement result storage section 23, and displays the measurement results of the test signals based on the respective communication methods (step S20).

FIG. 6 shows a display example of measurement results displayed on the display unit 15. FIG. 6 shows measurement results for test signals based on the communication methods STD1 to STD5. For example, the measurement result of the signal level is shown for a test signal based on the communication method STD1, and the measurement result of the signal level and the occupied bandwidth is shown for a test signal based on the communication method STD2. In addition, although only the result of a measured value may be displayed on the display screen of a measurement result, it is also possible to display whether or not the measurement result falls within a standard range set in advance using a symbol.

As described above, since the measurement apparatus 10 according to the present embodiment is configured to receive a continuous test signal including test signals based on a plurality of communication methods and measure each test signal, it is possible to measure the test signals based on the plurality of communication methods without performing call connection and the like. Therefore, the measurement apparatus 10 can shorten the time required for the measurement of a mobile terminal conforming to the plurality of communication methods.

INDUSTRIAL APPLICABILITY

As described above, the measurement apparatus and measurement method according to the present invention are advantageous in that time required for the measurement of a mobile terminal conforming to a plurality of communication methods can be shortened. Therefore, the measurement apparatus and measurement method according to the present invention are useful as a measurement apparatus and measurement method for measuring the output signal of a mobile terminal, such as a mobile phone.

DESCRIPTION OF REFERENCE NUMERALS AND SIGNS

10: measurement apparatus
11: operating unit
12: operation mode setting unit
13: measurement item setting unit (measurement item setting means)
14: transmission and reception unit (measurement item information transmission means, continuous test signal receiving means)
15: display unit
20: measurement means
21: acquisition section
22: measurement section
22a: first measurement section
22b: second measurement section
22c: third measurement section
22d: fourth measurement section
22e: fifth measurement section
22f: sixth measurement section
23: measurement result storage section
30: mobile terminal (terminal to be tested)
31: transmission and reception unit
32: BBIC
40: multi-mode RFIC
41: modulation and demodulation processing unit
42: test signal output unit
50, 60, 70: continuous test signal
71 to 75: test signal based on each communication method

The invention claimed is:

1. A measurement apparatus that measures an output signal in a test mode of a terminal to be tested capable of switching between a communication mode in which communication is performed according to a plurality of different communication methods and the test mode for testing communication characteristics in the communication mode, the measurement apparatus comprising:
  measurement item setting means for setting measurement items for each of the plurality of communication methods;

measurement item information transmission means for transmitting information of set measurement items, which are set by the measurement item setting means, to the terminal to be tested so as to output continuous test signals, each of which is a signal that the terminal to be tested outputs on the basis of the information of the set measurement items in the test mode based on each of the communication methods, and in which a predetermined time gap is set between each of the test signals;

continuous test signal receiving means for receiving the continuous test signal from the terminal to be tested; and measurement means for measuring characteristics of each of the test signals, which are included in the received continuous test signal, for the set measurement items, wherein the measurement means includes an acquisition section, which acquires the test signals sequentially, and a plurality of measurement sections, which measure characteristics of the test signals in order of acquisition of the acquisition section, and wherein each of the measurement sections measures each characteristic of one test signal in parallel with acquisition of a test signal subsequent to the one test signal after the one test signal is acquired by the acquisition section.

2. The measurement apparatus according to claim 1,
wherein the continuous test signal receiving means receives a continuous test signal including at least two test signals that are based on the same communication method and have different signal levels.

3. The measurement apparatus according to claim 1,
wherein each of the measurement sections starts measurement of each characteristic of the one test signal from a point in time after a predetermined time has passed from acquisition start time at which the acquisition section starts the acquisition of a test signal subsequent to the one test signal.

4. The measurement apparatus according to claim 2,
wherein each of the measurement sections starts measurement of each characteristic of the one test signal from a point in time after a predetermined time has passed from acquisition start time at which the acquisition section starts the acquisition of a test signal subsequent to the one test signal.

5. A measurement method using the measurement apparatus according to claim 1, comprising:
a measurement item setting step of setting measurement items for each of the plurality of communication methods;
a measurement item information transmission step of transmitting information of set measurement items, which are set in the measurement item setting step, to the terminal to be tested so as to output continuous test signals, each of which is a signal that the terminal to be tested outputs on the basis of the information of the set measurement items in the test mode based on each of the communication methods, and in which a predetermined time gap is set between each of the test signals;
a continuous test signal receiving step of receiving the continuous test signal from the terminal to be tested; and
a measurement step of measuring characteristics of each of the test signals, which are included in the received continuous test signal, for the set measurement items,
wherein the measurement step measures characteristics of the test signals in order of being received in the continuous test signal receiving step, and
wherein, in the measurement step, each characteristic of one test signal is measured in parallel with acquisition of a test signal subsequent to the one test signal after the one test signal is acquired by an acquisition section.

6. The measurement method according to claim 5,
wherein, in the measurement step, measurement of each characteristic of the one test signal is started from a point in time after a predetermined time has passed from acquisition start time at which the acquisition section starts the acquisition of a test signal subsequent to the one test signal.

7. The measurement apparatus according to claim 1, wherein the measurement means acquires the test signals and measures characteristics of each of the test signals according to switching of the test signals.

8. The measurement apparatus according to claim 1, wherein the measurement means can meet a variety of specifications of mobile terminals, the specifications being different in terms of time length of the test signals and a length of the predetermined time gap.

* * * * *